July 16, 1957     J. FEDERSPIEL     2,799,158
APPARATUS FOR THE SYSTEMATIC STUDY OF THE
SUSPENSION OF VEHICLES
Filed June 19, 1953     7 Sheets-Sheet 1
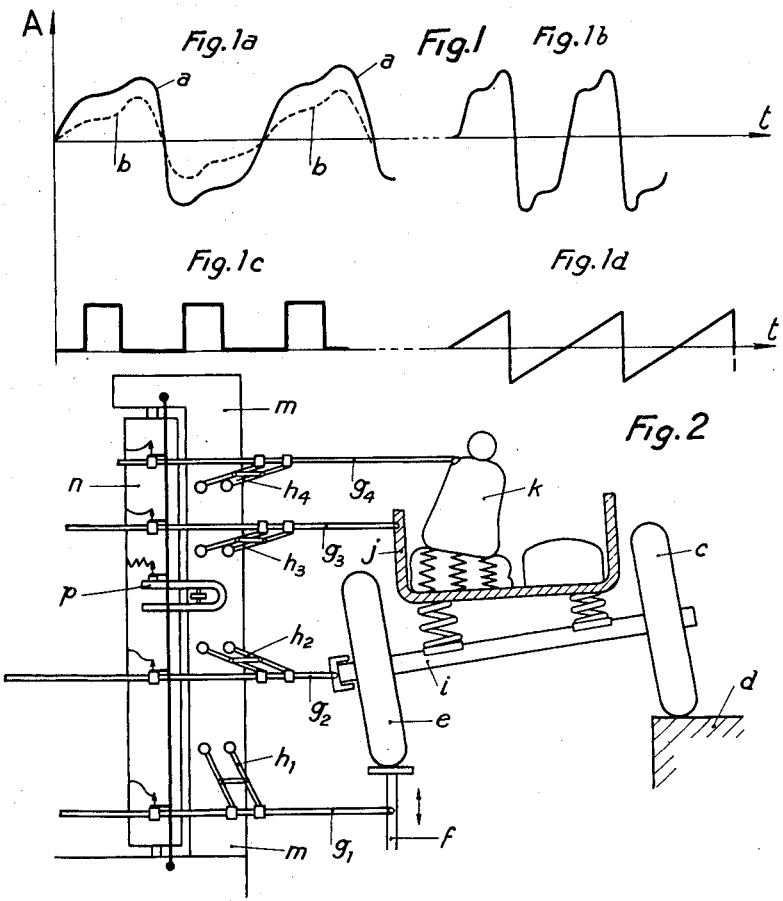
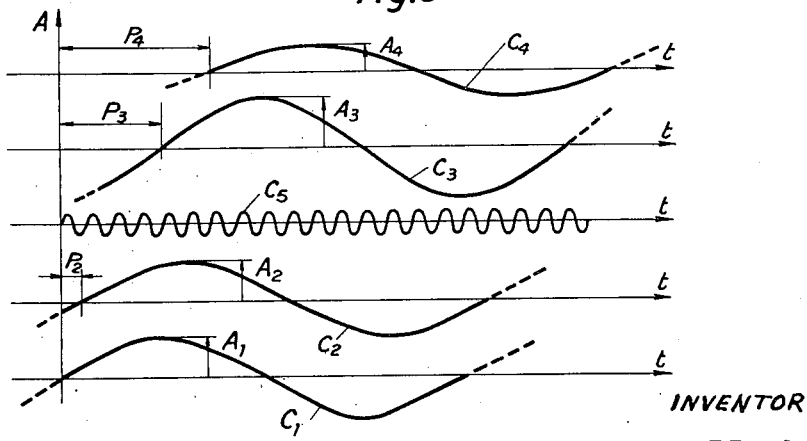
INVENTOR
JEAN FEDERSPIEL
By Linton and Linton
ATTORNEYS July 16, 1957

J. FEDERSPIEL 2,799,158

APPARATUS FOR THE SYSTEMATIC STUDY OF THE
SUSPENSION OF VEHICLES

Filed June 19, 1953

INVENTOR

JEAN FEDERSPIEL

By Linton and Linton
ATTORNEYS

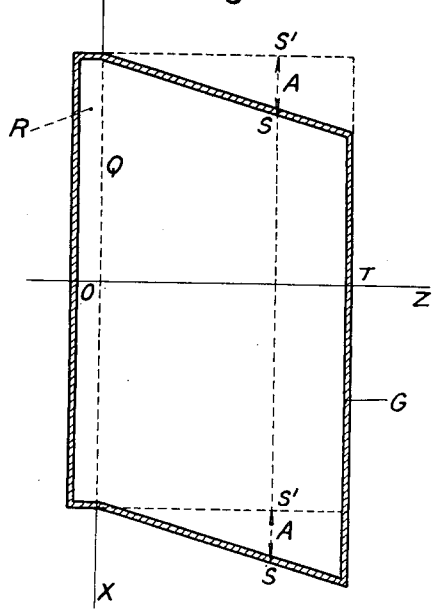
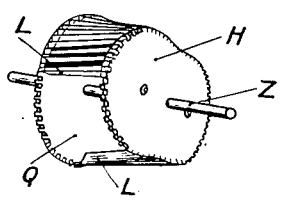
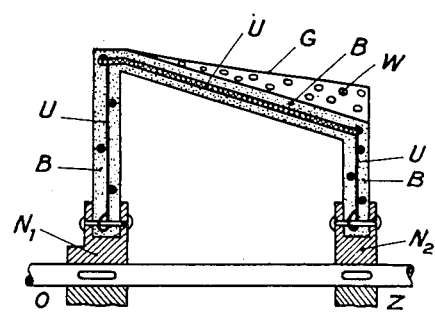

July 16, 1957  J. FEDERSPIEL  2,799,158
APPARATUS FOR THE SYSTEMATIC STUDY OF THE
SUSPENSION OF VEHICLES
Filed June 19, 1953  7 Sheets-Sheet 4
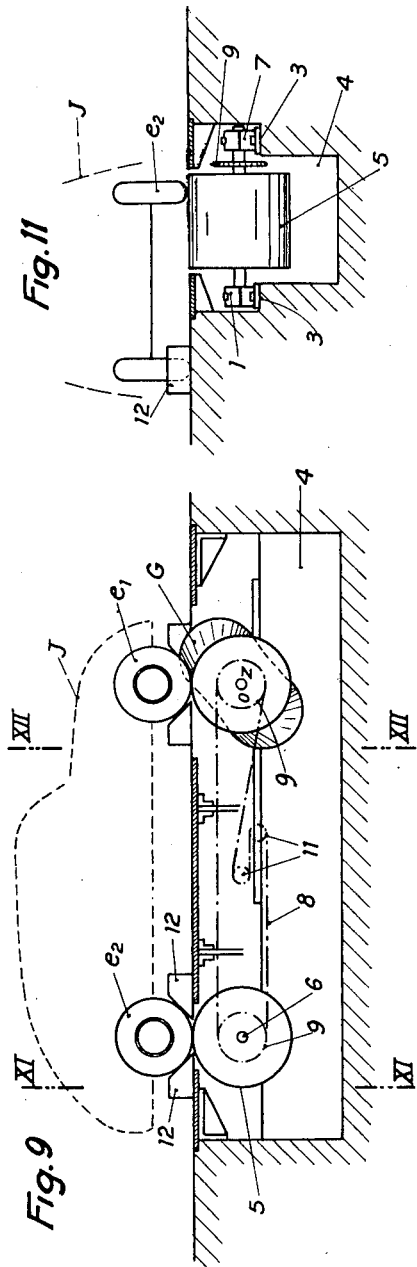
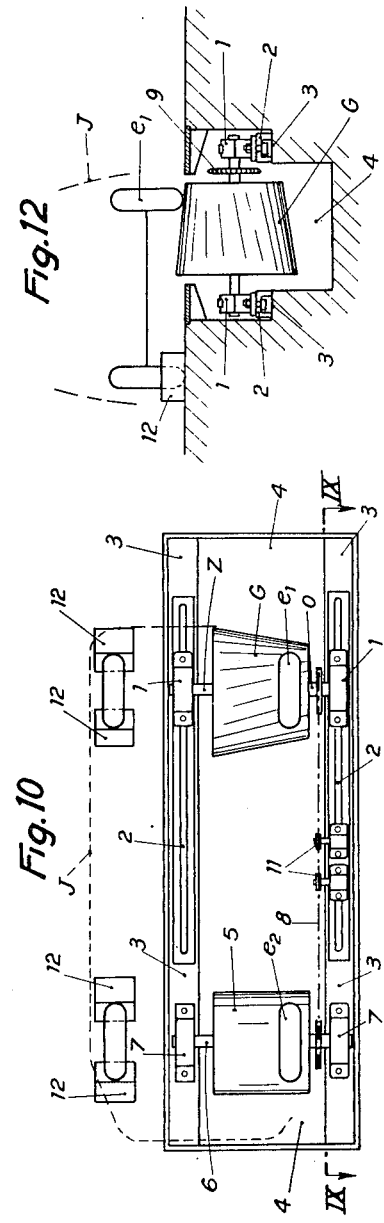
INVENTOR
JEAN FEDERSPIEL
By Linton and Linton
ATTORNEYS

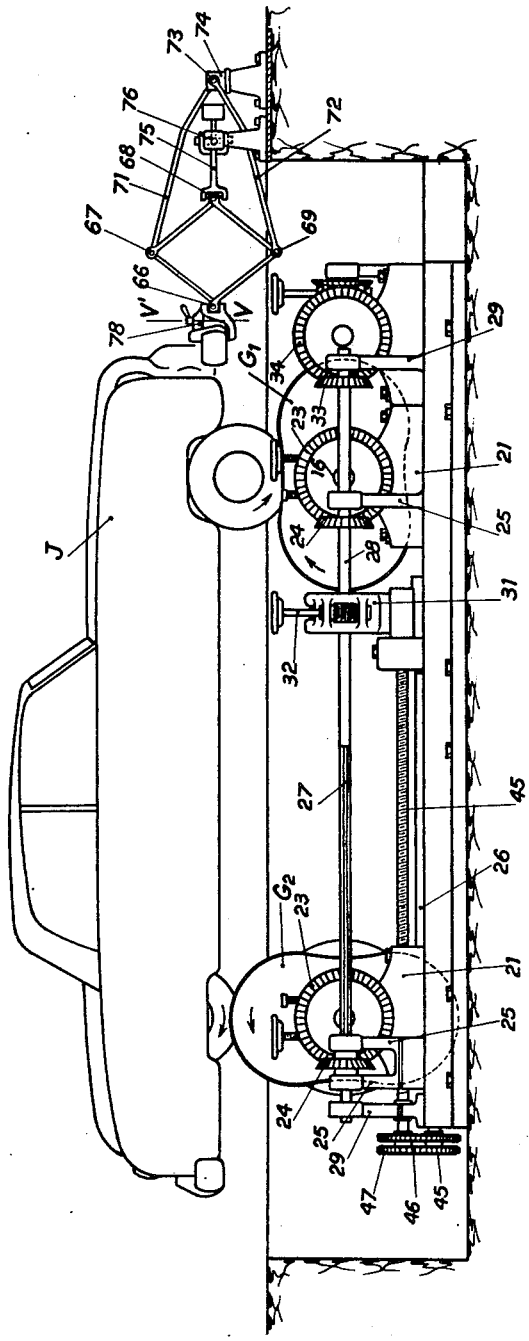

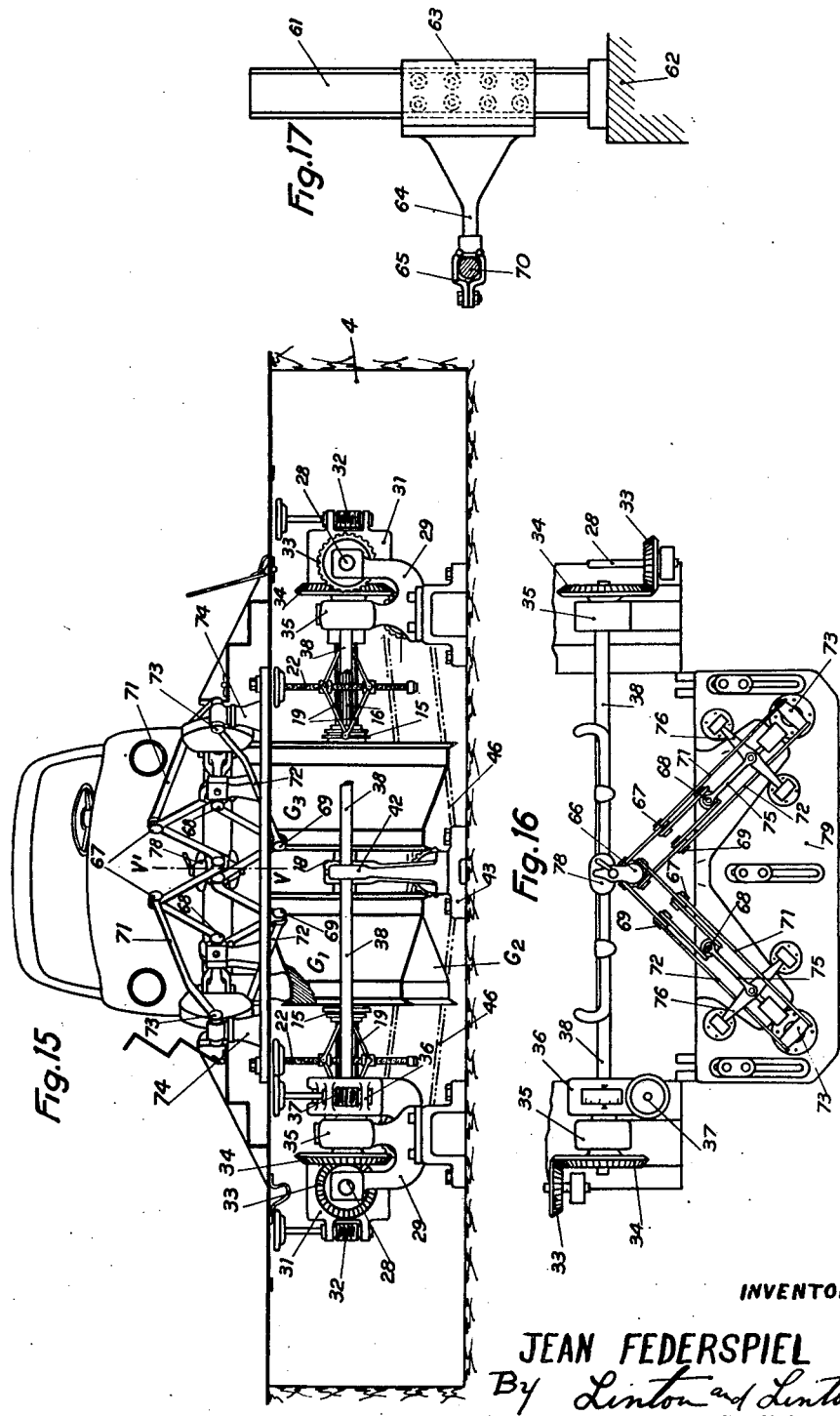

United States Patent Office 2,799,158
Patented July 16, 1957

2,799,158

APPARATUS FOR THE SYSTEMATIC STUDY OF THE SUSPENSION OF VEHICLES

Jean Federspiel, Paris, France

Application June 19, 1953, Serial No. 362,720

Claims priority, application France July 25, 1952

4 Claims. (Cl. 73—71.7)

The majority of road vehicles, such as motor bicycles, motor cars, trucks, and more widely, all vehicles fitted with wheels (aeroplanes, amphibious vehicles, etc.) comprise a certain number of members which, taken together constitute the suspension means for the vehicles, the object of which is to reduce or absorb the shocks, vibrations and other movements arising from the irregularities of the ground on which the vehicle travels.

Now the effectiveness of the suspension varies considerably, depending on the one hand on the members which constitute it and the load which it carries, and on the other hand on the nature of the irregularities encountered and the speed of the vehicle.

The present invention relates to devices permitting, in particular, a systematic study of the suspension of the vehicle and its effectiveness under all operational circumstances.

These devices are for transmitting to at least one of the wheels of the vehicle a reciprocating translational movement, known as incident movement, of a predetermined form, amplitude and frequency, sensing the movement transmitted by the suspension at various points of the vehicle, and comparing the transmitted movement and the incident movement, preferably after they have been recorded.

In a preferred embodiment of the invention, the incident reciprocating translational movement is substantially vertical and has sinusoidal characteristics.

The devices according to the invention comprise at least one undulated rotatable body, the periphery of which constitutes a track for the wheel of the vehicle being studied and acting as a cam for said wheel. This wheel rests on the cam, substantially directly above its axis of rotation, while the profile of the cam transmits to the wheel axle, by rotation, a reciprocating translational movement having given characteristics.

In a preferred embodiment of the profile of the cam, said profile resembles the undulating contour defined in polar coordinates $(r, u)$ by the equation:

$$r = D + A \cos nu$$

D and A being constants and $n$ a whole number.

Other characteristics of the method and devices of the invention are revealed in the following description.

In the accompanying drawings, given by way of example and without any limiting character, Figures 1a, 1b, 1c and 1d show different types of incident movement.

Figure 2 shows diagrammatically, in elevation, a simplified testing device.

Figure 3 shows the curves obtained by means of the device in Figure 2.

Figure 4:
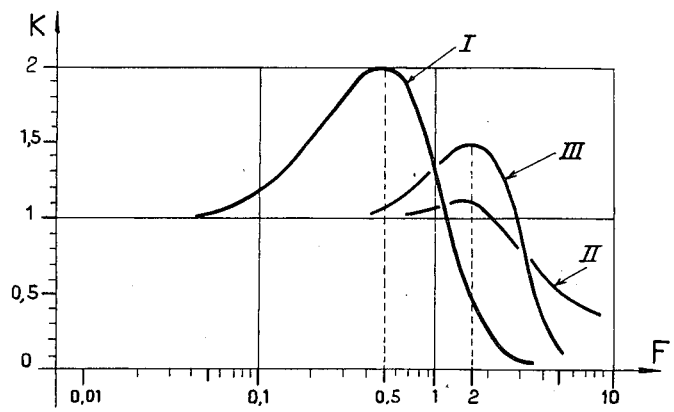

Figure 4 gives examples of characteristic curves.

Figure 5:
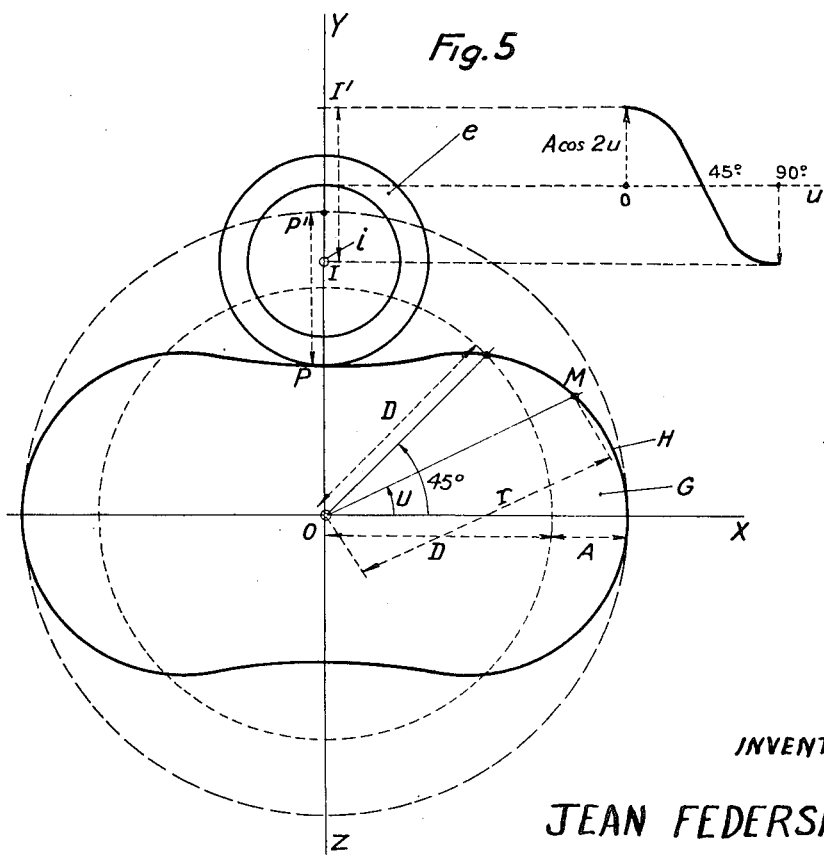

Figure 5 relates to a particular profile of the track cam.

Figure 6 shows the same cam in section along the planes Oyz and Oxz in Figure 5.

Figure 7 shows in perspective, partially cut away, a wooden embodiment of the same cam.

Figure 8 shows another embodiment, in reinforced concrete, along a fragmentary axial section.

Fig. 9 is a sectional view of a further form of testing device including an undulated body constituting a track cam and taken on line IX—IX of Fig. 10.

Fig. 10 is a top view of said testing device.

Fig. 11 is a vertical section of the device taken on line XI—XI of Fig. 9.

Fig. 12 is a further vertical section taken on line XII—XII of Fig. 9.

Figure 13 is a longitudinal view in elevation of a further form of test bed.

Figure 14:
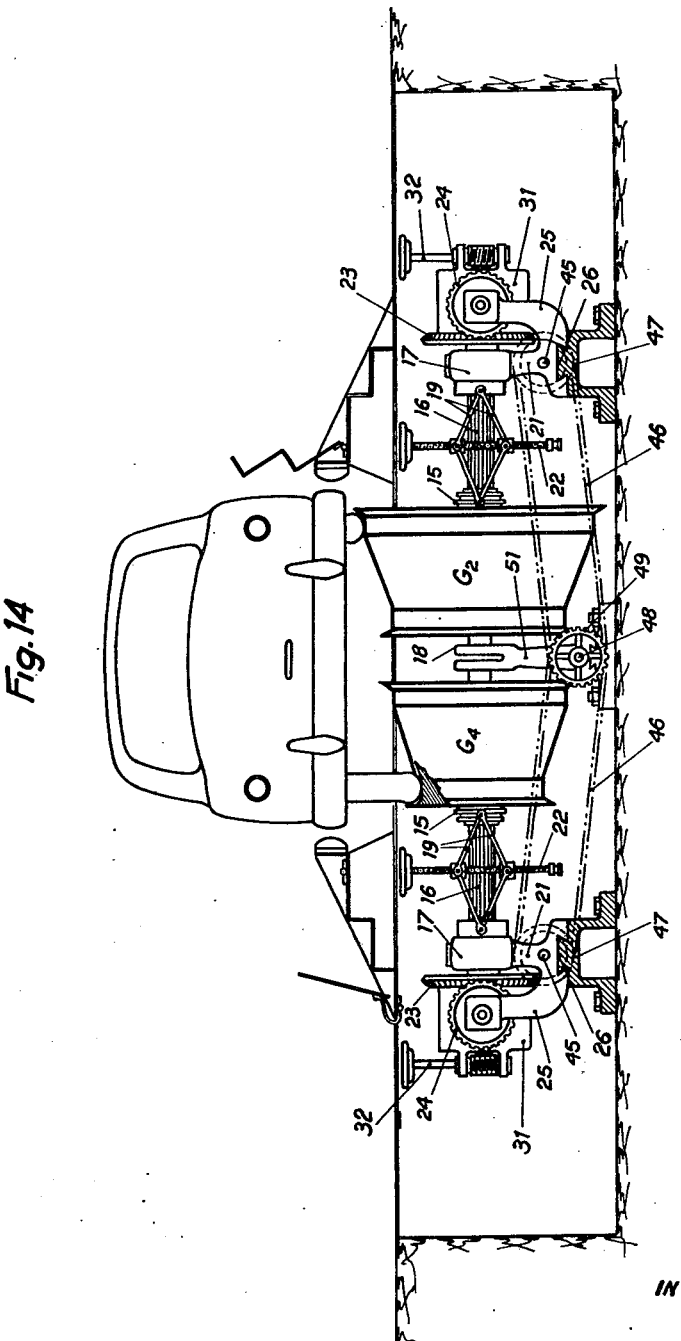

Figure 14 is a rear view of said test bed.

Figure 15 is a front view of said test bed.

Figure 16 is a plan view of the front portion of the test bed.

Figure 17 shows a special locating device in elevation.

In the apparatus according to the invention, the incident translational movement imparted to at least one of the wheels may have very varied characteristics, as regards form, amplitude and frequency. Several examples are shown in Figure 1 where the axis of the abcissae represents the time $t$ and the axis of the ordinates the amplitude A of the displacement.

For a given profile of the incident wave form, it is possible, for example, to vary the amplitude (Figure 1a curves a and b) while preserving the frequency, or the frequency while preserving the amplitude (Figure 1b). The wave may also appear in the form of successive impulses (Figure 1c) or may have a discontinuous profile (Figure 1d).

In every case the characteristics of the incident wave should be well defined.

The choice of these characteristics depends on the fields in which it is desired to study the behaviour of the suspension. Thus the incident wave may represent the vibrations received by the wheels of the vehicle when it is running on a given type of road (gravel, pave-gutters, hog-back, cross drain, level crossings, etc.).

According to the invention, the movements transmitted to the vehicle by the suspension are sensed at as many points as necessary. These movements are preferably recorded and they are compared with the incident movement. This comparative study enables the behaviour and efficiency of the suspension to be defined.

Figure 2 shows very diagrammatically means for recording the incident and transmitted oscillations. A vehicle, seen in section, rests on some of its wheels, such as $c$ on a frame $d$. The other wheel $e$ of the vehicle is subjected to incident movement provided by a generator shown diagrammatically at $f$. This generator may be constituted by a supporting member (such as a piston) driven with the desired reciprocating movement and on which the wheel $e$ rests by means of the tire. It may equally as well be constituted by a profiled cam on which the tire runs.

The recording device should be suitable for the range of frequency of the oscillations (from 0.1 to 100 cycles per second, for example) and for the amplitudes thereof.

For low or medium frequency oscillations (for example up to 10 cycles per second) a mechanical recording device can be used. This device should preferably give curves which can be compared with one another. For this purpose, the displacement of each stylus should be equal (or proportional in a given ratio) to the displacement component along one of the coordinate axes, from the point of the vehicle under consideration.

In the device shown in Figure 2, the displacement of the styli is equal to the vertical component of the movement of the vehicle. To achieve this, rods $g_1, g_2, g_3$ and $g_4$ which are rigid and very light, are articulated on the one hand to the points where it is desired to sense the vertical movement component, namely: the generator $f$, the axle $i$, the body $j$, and the dummy $k$. Moreover each of these rods can slide freely along one side of an articulated parallelogram, $h_1$, $h_2$, $h_3$, or $h_4$ respectively, the opposite side of which is horizontal and fixed to a column $m$. This column supports in addition to a tuning fork $p$, a recording drum $n$. Styli, which can slide on the rods $g$, are constrained to remain aligned along the same generatrix of the drum $n$.

The operation of this device is easily understood: the motion of $f$ is transmitted to the tire $e$, to the axle $i$, to the body $j$, and to the dummy $k$. The rods $g_1$, $g_2$ etc. which are constrained to remain horizontal by the parallelograms $h_1$, $h_2$, etc. cause the styli to move distances equal to the vertical component of the movement of the various connecting points. The curves traced by the styli are recorded simultaneously on the drum $n$ which turns with a uniform movement while the tuning fork $p$ provides the time base.

The recording device may obviously comprise numerous variants. In the first place, pantographs can be used instead of the systems $g$, $h$. Secondly, photographic recording is possible. If the frequencies are too high, vibrographs or electronic devices can be used.

Figure 3 shows an example of the curves obtained by the above mentioned apparatus. All these curves relate to the vertical displacement component. The time $t$ is given on the abscissa, and the amplitude A on the ordinates. The curve $C_1$ represents the incident movement which has been given a sinusoidal appearance. This curve is traced by the stylus carried by arm $g_1$. Its amplitude is $A_1$.

The curve $C_2$ corresponds to the movement of the wheel axles. Its amplitude is $A_2$. It also shows a characteristic phase-displacement $P_2$ in relation to $C_1$. The differences between the curves $C_1$ and $C_2$ represent the effect of the wheel tires on the suspension in general.

The curve $C_3$ shows the displacements relating to the body $j$. By comparison with $C_1$ the effect of the suspension members (tires+springs) can be deduced in the suspension in general. By comparison with $C_2$, it shows the effect of the springs alone.

The same applies to the other curves traced, such as $C_4$ relating to the motion of the dummy $k$. Finally the curve $C_5$ traced by the tuning fork $p$ defines the time base.

Needless to say, in order to eliminate the effect of the tires, it would also be possible to connect the incident movement generator $f$ direct to the axle $i$.

In a preferred embodiment of the apparatus the incident movement has sinusoidal characteristics. In these circumstances it is possible to carry out a systematic analytical study of the suspension.

In actual fact an incident movement having any characteristics can be split up into a Fourier series (fundamental frequency and harmonics). The suspension is then comparable to a filter in radio engineering, and if the coefficient of transmission is defined $$K = \frac{A_3}{A_1}$$

it is possible to draw up a curve giving the values of K as a function of the frequency.

Such curves are illustrated in Figure 4 where the frequency F is shown on the abscissa on a logarithmic scale and the values of K on the ordinate.

It will be seen that if K is less than 1 there is damping and if K is greater than 1, there is amplification, and so far from acting the suspension has the opposite effect. The curve I relates to a suspension of a certain quality. Curve II to a suspension of a different quality. Curve III to the same suspension after maladjustment.

In all the curves, the existence of a resonance frequency will be noted (equal to 0.5 cycle per second for the first suspension and 2 cycles per second for the second).

The display of this resonance frequency is one of the principal characteristics which the invention makes it possible to achieve.

In a preferred embodiment for carrying out the method, the incident movement generator $f$ is constituted by an undulated body G providing a track for the wheel and acting as a cam on which one of the wheels of the vehicle being studied runs. The undulation of the cam is such that in this running movement, the vertical component of the displacement of the wheel is sinusoidal in time.

Figure 5 shows a profile H corresponding closely to the conditions stated above. This profile is symmetrical in relation to its centre O, and in relation to the axes OX and OY. The axle $i$ of the wheel $e$ which is constrained to move along OY, runs without sliding on H which pivots at O.

Two cycles of the sine curve described by $i$ correspond to one revolution of the profile H.

The plotting of the profile H of the cam G can easily be obtained if it is assumed that the point of contact of the wheel $e$ and the cam G is always situated substantially on OY. In these circumstances the equation in polar coordinates of the curve H is:

$$r = D + A \cos 2u$$

where $r$ represents the radius vector OM and $u$ the polar angle.

The point of contact of the wheel $e$ and the cam G is displaced in these circumstances along OY between the ordinates $D-A$ and $D+A$ (points P and P'). The same applies to the hub $i$, which oscillates between I and I'. In practice the value of A should scarcely exceed 20 cm.

In a preferred embodiment, the body constituting the cam G is substantially frusto-conical, the small base having as its section the above-mentioned curve H while the large base is circular.

Such an arrangement is shown in section in Figure 6 where OZ is the cam axis, and Q the large circular base extended by a cylindrical rolling track R. The amplitude A of the curve H, which is assumed to be nil in the plane $Z=0$, increases with the dimension of the section under consideration. The law governing the variation of A is preferably linear with Z and represented, starting from the cylinder with base Q, by the segment SS'.

In practice the height of the cam defined by CT can be of the order of 50 cm. The plotting of the cam is done by constructing the profiles H as shown in Figure 5 in various planes Z, and by joining the various curves obtained. More simply, it is possible merely to join directly the profile H of the plane $Z=OT$ to the circle Q of the plane $Z=0$. Such an embodiment is shown in perspective in Figure 7 where the circle Q and the profile H are constituted by plates, for example made of wood, provided with marginal teeth into which are inserted laths L.

In another embodiment illustrated in Figures 8, the cam G is made of reinforced concrete. The profile of the cam is constituted by a metallic reinforcement U suitably arranged round two cores $N_1$ and $N_2$ keyed on the axis of rotation OZ, a layer of concrete B being poured round the reinforcement U. This concrete layer provides the cam with a continuous outer surface. In order to increase the adherence of the wheel $e$ to the surface of the cam, small, evenly distributed cavities W, are provided in the latter.

More generally, the invention covers track cams wherein the profile H approaches the undulating contour defined in polar coordinates (radius vector $r$, polar angle $u$) by the equation:

$$r = D + A \cos nu$$

$n$ being a whole number.

In using the cams which have just been described, it is obvious that the incident movement frequency depends on the speed of rotation of the cam, while the amplitude of this movement depends on the position of the wheel $e$ on the cam. This amplitude is nil if the wheel is on the rolling track R, and is at its maximum if the wheel is on the opposite side. It goes without saying that it makes no difference whether the wheel $e$ is driven by the cam G or vice versa. Moreover, to change the amplitude it is sufficient to modify the relative positions of the wheel and the cam by moving one or the other of them.

A simplified device using the cam G and the method described above is shown in Figures 9 to 12. This device is intended to provide a brief study of the suspension.

The cam G carried by the axle OZ is mounted in bearings 1 the position of which can be adjusted in slides 2 provided on the steps 3 situated half way up a parallelepipedic pit 4. The cam G is situated towards one end of the pit 4. Towards the other end there is situated a drum 5 carried by a shaft 6 rotating in fixed bearings 7.

The drum 5 and the cam G are connected together by means of a transmission chain 8 passing over toothed pinions 9 carried by the shafts OZ and 6.

A tensioning device consisting of two pulleys 11 which can slide in one of the slides 2 enables the tension of the chain 9 to be adjusted whatever the position of the cam G.

Such a device makes it possible to make a rapid study of the suspension of a vehicle by applying the incident movement to one wheel only. For this purpose, the vehicle J, for example a motor car, is placed in such a manner that two of its wheels rest on the ground the other two $e_1$ and $e_2$ resting respectively on the cam G and the drum 5. The other wheels are kept in position by chocks 12.

The operation is then clear, assuming that the rear wheels of the vehicle are the driving wheels, the wheel $e_2$ drives 5 which transmits its movement to G by means of 9. The rotational movement of G transmits the desired incident oscillations to $e_1$. The frequency of these oscillations is determined by the speed of rotation of $e_2$. As for their amplitude, this can be modified by displacing the vehicle J and its chocks 12 laterally.

Needless to say a recording system, which is not represented but is similar to that described with reference to Figure 2, is associated with the device described above.

There is also provided an improved device making it possible to make a complete and detailed study of the suspension, and constituting a real test bed.

This device, which is illustrated (with the exception of the recording equipment) on Figures 13 to 16, makes it possible to subject the four wheels of a vehicle J simultaneously to an incident movement, whatever the wheel-base and length of the vehicle, and moreover the phase and amplitude of each of the four incident movements can be regulated at will and independently of one another.

For this purpose the studying device comprises four cams $G_1$, $G_2$, $G_3$, $G_4$, for example of the type previously described. Each of these cams is mounted by means of a driving sleeve 15 on a splined shaft 16 the smooth ends of which can turn in bearings 17 and 18.

In addition, each of the sleeves 15 comprises a collar into which is fitted the apex of a toggle device 19, the opposite apex of which is attached to the support 21, which is rigidly secured to the plummer-blocks 17. The other two apices of the toggle device 19 are carried by an oppositely threaded regulating screw 22. Each of the shafts 16 is extended beyond the plummer-blocks 17 by a bevel pinion 23, which engages with a second bevel pinion 24 carried by an arm 25. The supports 21 associated with the cams $G_1$ and $G_3$ are secured to the floor of the pit 4. On the other hand, the supports 21, which are associated with the cams $G_2$ and $G_4$, and the arms 25 rigidly secured thereto, can slide longitudinally on dovetailed slideways 26 (Figures 13 and 14).

The pinions 24 are fastened together in pairs by two coaxial longitudinal shafts 27 and 28, the shaft 27 being also splined.

The opposite ends of the shafts 27 and 28 are carried by fixed supports 29. The adjacent ends, on the other hand, form the sun-wheels of a differential with a movable planetary-wheel carrier. This differential is carried by the fixed stand 31. The angular position of the carrier is controlled by the hand-wheel and regulating screw 32. The end of the shaft 28 next to 29 carries a bevel pinion 33 which engages a bevel pinion 34. On the $G_1$ side (Figures 15 and 16) the shaft driven by the pinion 34 enters a fixed plummer-block 35 and ends in the sun-wheel of a differential with a movable carrier, the casing for which is seen at 36 and the regulating screw at 37. The other sun-wheel of this differential is connected to a shaft 38, carried by the central fixed plummer-block 42, mounted on base 43 and traversing the plummer-block 35 to terminate at the other pinion 34 situated on the $G_3$ side.

The assembly which has just been described is completed by two longitudinal threaded rods 45 traversing the supports 21 which act as nuts. These rods are actuated by means of a chain 46 and sprocket 47, from a central shaft 48 carrying two sprockets 49. The shaft 48 is rigidly secured to a threaded rod similar to 45 which traverses the pedestal 51 of the bearings 18, likewise mounted on a slideway.

The operation of this assembly is easily understood: the longitudinal distance between the cams $G_1$, $G_3$ and $G_2$, $G_4$ is first regulated as desired by causing the supports 21, the pedestal 51 and the members attached thereto (particularly the cams $G_2$ and $G_4$) to slide on the slideways 26. This result is obtained by simultaneously turning the rods 45 by means of the shaft 48, via the sprockets 49, 47 and the chains 46.

The shaft 48 is driven by an electric motor which is not illustrated (in the figures the distance between the cams $G_1$ and $G_2$ is assumed to be the maximum). Then the vehicle J is positioned on the cams and held thereon by any convenient means. The amplitude of the movement is regulated separately for each cam, by adjusting the lateral position thereof by means of the screws 22 controlling the opening of the toggle devices 19.

On the accompanying drawings the cams $G_1$, $G_2$, $G_3$, $G_4$ are shown in the position corresponding to the maximum amplitude.

On the other hand the phase displacement between $G_1$ and $G_2$ is obtained by turning, via 32, the carrier of the differential carried by 31. The same applies to the phase displacement between $G_3$ and $G_4$. In the figures this phase displacement is 180° between $G_1$ and $G_2$. Finally the phase displacement between $G_1$ and $G_3$ is obtained by actuating the screw 37 controlling the angular position of the carrier of the differential carried by 36. The four cams driven by means of the engine and wheels of the vehicle J are thus angularly interlocked by the transmission constituted by the shafts 27, 28, 38 and the corresponding pinions. An incident movement of the same frequency is thus applied to all four wheels of the vehicle J. It will also be noticed that variations in amplitude may be introduced during operation by actuating the hand-wheels and regulating screws, such as 22.

Needless to say, it is necessary to retain the vehicle J in such a position that the axes of its wheels are substantially directly above the axes of the cams G. Numerous locating devices permitting vertical displacement can be used for this purpose.

A very simple one is shown in Figure 17. It consists of an upright 61 of double U iron, embedded in the surrounding wall 62 of the pit 4. A carriage 63 provided with an internal roller system can slide up and down the upright 61. The carriage 63 is extended by an arm 64 to which is articulated a jaw 65. This jaw may grip the axle 70 of the vehicle, for example, and permit it to have two movements: one of vertical translation and one of rotation about the arm 64, It goes without saying that the number of locating devices, as well as the position of the anchorage points on the vehicle can be modified at will, according to needs. In particular these anchorage points may be situated on the axles or on the bodywork.

A specific locating device connected to the middle of the front bumpers of the vehicle is shown in Figures 13 to 16. This device is constituted by the joining of two articulated assemblies identical to that shown in Figure 13. Each of these assemblies comprises a diamond 66, 67, 68, 69. The apices 67 and 69 are connected by means of arms 71 and 72 articulated about a horizontal pin 73 and about a vertical pivot 74.

Similarly the apex 68 is connected by an arm 75 to a horizontal shaft 76. The respective positions of the pivot 74 and of the shaft 76 and the position of the assembly in relation to the symmetrical plane of the test bed can be seen on Figures 15 and 16. The whole of this assembly is mounted on a plate 79 which is capable of sliding.

The two apices 66 of each diamond are joined together and carry a jaw 78 mounted on a swivel joint and gripping the bumper of the vhicle J. In these circumstances it is known from Peaucellier's geometrical theorem of the reversing lever that if the apex 68 of a diamond describes a portion of a sphere, the apex 66 moves in a plane. The planes in question, relating to each of the above-mentioned diamonds, intersect along a vertical straight line V, V', and the jaw 78 and the center of the bumper gripped thereby are thus constrained to describe this straight line.

It goes without saying that the invention is not limited to the devices described.

In particular the track cams could be driving instead of being driven by the engine of the vehicle. On the other hand if it is not desired to study the effect of the tires on the suspension, the incident movement can be applied direct to the wheel axles, by securing these to rods to which reciprocating movements are imparted by any known means. Finally, since there is no limitation on the frequencies of the incident movement, the invention may conveniently be used to study the generation and transmission of audible frequencies (noises) on the vehicle.

I claim:

1. A device for the systematic study of the spring suspension of wheeled vehicles, comprising a frame, at least one body having an axis of symmetry and rotatably mounted on said frame for rotation around said axis, said body constituting a track for one wheel of the vehicle being studied with the axle of said wheel being substantially parallel to the axis of said body, one transverse section at least of said track having an undulated contour defined by the equation in polar coordinates $$(r, u): r = D + A \cos nu$$

with D and A being parameters and $n$ a whole number, means for rotating said body around its axis with said body acting as a cam for imparting definite oscillations to said wheel, means for recording the amplitude of the incident movement of said wheel, said recording means being connected at various points of the vehicle to be studied for simultaneously recording the amplitude of the oscillations transmitted to said points by said spring suspension.

2. A device for the systematic study of the spring suspension of wheeled vehicles, comprising a frame, at least one body having an axis of symmetry and rotatably mounted on said frame for rotation around said axis, said body also having two coaxial bases, one of said bases being circular and the other base having an undulated contour defined by the equation in polar coordinates $$(r, u): r = D + A \cos nu$$

with D and A being parameters and $n$ a whole number, said body constituting between said bases an undulated track for one wheel of the vehicle being studied with the axle of said wheel being substantially parallel to the axis of said body, means for rotating said body around its axis with said body acting as a cam for imparting definite oscillations to said wheel, means capable of simultaneously recording the amplitudes of various oscillations and means for connecting said recording means to various points of the vehicle to be studied with one of said points being located on the axle of the wheel resting on said track.

3. A test-bed for a four wheeled vehicle having a spring suspension, said test-bed comprising a frame, two sets of two undulated bodies having axes of symmetry and rotatably mounted on said frame for rotation around said axes, said two bodies of each set having the same axis and the axes of said two sets being parallel, means for modifying by translation the distance between said axes, means for transversally displacing each body along its axis, means for interlocking said bodies for axial rotation, said bodies constituting tracks for the wheels of the vehicle to be studied with the axles of said wheels being substantially parallel to the axes of said bodies, one transverse section at least of each of said tracks having an undulated contour defined by the equation in polar coordinates $(r, u): r = D + A \cos nu$, with D and A being parameters and $n$ a whole number, means for rotating said bodies around said axes, said bodies acting as cams for imparting definite oscillations to said wheels, means capable of simultaneously recording the amplitudes of various oscillations and means for connecting said recording means to various points of the vehicle to be studied with one of said points at least being located on one of the axles of the wheels of said vehicle.

4. A test-bed for a four wheeled vehicle having a spring suspension with said test-bed comprising a frame, a pair of axles supported by said frame, two sets of two undulated bodies having axes of symmetry and being rotatably mounted on said axles which coincide with said axes, said two bodies of each set having the same axle and the axles of said two sets being parallel, means for modifying by translation the distance between said axles, means for transversally displacing each body along its axle, means for interlocking said bodies for synchronous rotation comprising transmission shafts extending between said axles of different sets of bodies, gears connecting said axles and said shafts and differentials with adjustable planetary wheel carrier interposed on some of said shafts between said two axles, said differentials allowing a variable angular phase displacement between each body of said two sets, said bodies constituting tracks for the wheels of the vehicle to be studied with the axles of said wheels substantially parallel to the axles of said bodies, one transverse section at least of each of said tracks having an undulated contour defined by the equation in polar coordinates $(r, u): r = D + A \cos nu$, with D and A being parameters and $n$ a whole number, means for rotating said bodies around said axles, said bodies acting thus as cams for imparting definite oscillations to said wheels, means for simultaneously recording the amplitudes of various oscillations and means for connecting said recording means to various points of the vehicle to be studied with one of said points at least being located on one of the axles of the wheels of said vehicle.

References Cited in the file of this patent

UNITED STATES PATENTS

| 1,511,818 | Moore | Oct. 14, 1924 |
| 1,891,613 | Widney | Dec. 20, 1932 |
| 1,921,320 | Palmer | Aug. 8, 1933 |
| 2,709,361 | Marcus et al. | May 31, 1955 |

FOREIGN PATENTS

| 541,203 | Great Britain | Nov. 17, 1941 |